United States Patent [19]

Schmidt

[11] Patent Number: 5,254,630
[45] Date of Patent: Oct. 19, 1993

[54] PROCESS FOR THE PRODUCTION OF A VINYL CHLORIDE-BUTYL ACRYLATE GRAFT COPOLYMER FOR PROCESSING BY INJECTION MOLDING

[75] Inventor: Frank Schmidt, Essen, Fed. Rep. of Germany

[73] Assignee: Huels Aktiengesellschaft, Marl, Fed. Rep. of Germany

[21] Appl. No.: 603,506

[22] Filed: Oct. 26, 1990

[30] Foreign Application Priority Data

Oct. 28, 1989 [DE] Fed. Rep. of Germany ....... 3936066

[51] Int. Cl.$^5$ ................. C08F 251/00; C08F 253/00; C08F 225/00; C08F 257/00
[52] U.S. Cl. ................. 525/261; 525/263; 525/260; 525/266
[58] Field of Search ................. 525/261, 263, 260, 266

[56] References Cited

U.S. PATENT DOCUMENTS

| | | | |
|---|---|---|---|
| 3,832,318 | 8/1974 | Gallagher et al. | 524/43 |
| 3,851,016 | 11/1974 | Nicolet et al. | 525/261 |
| 4,162,239 | 7/1979 | Nicolet et al. | 525/262 |

FOREIGN PATENT DOCUMENTS 1530854 11/1978 United Kingdom.

OTHER PUBLICATIONS

Derwent Publications Ltd. 82-62386E & JP-A-57 098 543.
Derwent Publictions Ltd. 82-23188E & JP-A-57 028 124.

Primary Examiner—John Kight, III
Assistant Examiner—Duc Truong
Attorney, Agent, or Firm—Millen, White, Zelano, & Branigan

[57] ABSTRACT

A method for manufacturing vinyl chloride-butyl acrylate graft copolymers for processing by injection molding is provided wherein vinyl chloride is grafted onto crosslinked polybutyl acrylate in the presence of chain regulators. The graft copolymers exhibit excellent flow characteristics as a melt and provide molded parts with good surface quality and excellent mechanical properties.

9 Claims, No Drawings

PROCESS FOR THE PRODUCTION OF A VINYL CHLORIDE-BUTYL ACRYLATE GRAFT COPOLYMER FOR PROCESSING BY INJECTION MOLDING

BACKGROUND OF THE INVENTION

The invention relates to the production of a graft copolymer of vinyl chloride (VC) onto a crosslinked butyl acrylate polymer, exhibiting improved processing properties, especially during injection molding, without there being a loss in good physical properties.

Numerous attempts have been made in the past to improve the processability of VC polymers, i.e., to reduce the viscosity of the polymer melt which, at a given temperature and shear rate, is dependent on the average molecular weight of polyvinyl chloride (PVC).

Thus, readily flowing polymer melts can be obtained by using polyvinyl chloride having a low average molecular weight with a narrow molecular weight distribution; however, these melts exhibit poor mechanical properties as finished articles [Pol. Eng. Sci. 17 (1977), 194 et seq.]. Therefore, methods have been developed with the objective of broadening the molecular weight distribution of polyvinyl chloride.

Thus, in accordance with DOS 2,651,532, a mechanical mixing of polyvinyl chloride powders having differing average molecular weights is performed. This process is, however, expensive on an industrial scale and yields powders processable on injection molding machines into smooth-surface finished parts only if the average molecular weights of the mixture components are not too different. The thus-attained lowering of the melt viscosity, though, is minor. In contrast, when mixing two powders having highly differing average molecular weights, the resultant finished PVC parts have rough surfaces and flow lines. The cause of this resides in the heterogeneity of the powder. The very low molecular weight PVC granules melt more rapidly in the plasticizing zone of the injection molding machine than the high molecular weight PVC grains, reduce the melt viscosity, and thereby impair (similarly as in the case of adding excessive amounts of lubricant) the plasticizing step for the high molecular weight proportion, leading to flaws in the finished product.

The drawback of powder heterogeneity with regard to molecular weight is avoided in the method of DOS 2,606,934. The latter describes the possibility of varying the molecular weight during VC suspension polymerization by the simultaneous presence of regulating (molecular-weight-lowering) and branching (molecular-weight-raising) materials. The thus-attainable reduction in PVC melt viscosity is related to the quantities of regulating and branching components added. The higher the quantities, the lower the melt viscosity. However, it is impossible, following this procedure, to produce polyvinyl chloride injection-molded parts having a flawless, smooth surface characteristic from powder material having reduced melt viscosity; this has been confirmed by experiments. The cause of this resides in the nature of the branching components, leading to crosslinking of the macro-molecules recognizable by gel particles which are insoluble in cyclohexanone, for example.

DOS 1,943,638 avoids the use of branching components with a process that provides for broadening the molecular weight distribution by polymerization at various temperatures wherein compounds regulating molecular weight can optionally be present. However, the reduction in melt viscosity for products having the same average molecular weight remains small. Improvement in flow is also described in EP 0,137,138 B1 by the addition, based on the conversion, of regulating compounds and by polymerization of at least two different temperatures. In this process, broadening of the molecular weight distribution is likewise achieved. However, the mechanical properties of the finished parts, such as, for example, notched impact strength, leave much to be desired.

An improvement in the impact resistance of PVC can be obtained by the incorporation of rubber or other high polymers viscoelastic at room temperature. This can be done, for example, by mixing on a roll mill at high temperatures or by mixing the dispersions of a polyvinyl chloride and of a visco-elastic polymer or impact-strength-modified PVC. However, even with the use of a low molecular weight polyvinyl chloride, it is still impossible to achieve an adequately low melt viscosity that would permit use of the mixture for the manufacture of large thin-walled molded parts without shear lines.

It has now been discovered surprisingly that by graft copolymerization of VC to preferably 1-20% by weight of a crosslinked polybutyl acrylate in an aqueous dispersion, with the simultaneous use of materials having a chain transfer effect, a product can be obtained having satisfactory grain size distribution and a narrow molecular weight distribution, the low melt viscosity of which makes it suitable for processing, for example, by the injection molding method, and the notched impact strength of which is improved as compared with homopolymers, without, however, having to suffer a loss in heat resistance or surface characteristics of the thus-manufactured molded parts.

SUMMARY OF THE INVENTION

The present invention is directed to vinyl chloride-butyl acrylate graft copolymers which exhibit good flow characteristics and impact properties, methods for producing these polymers, and articles obtained therefrom. The polymers are obtained by polymerizing vinyl chloride in the presence of crosslinked polybutyl acrylate and one or more regulator compounds.

An object of this invention is to provide a polyvinyl chloride (PVC) polymer with good flow characteristics, low melt viscosity and good impact properties. (Notched Izod Impact 710.0).

Another object of this invention is to provide a method for producing PVC polymers with good particle size distribution for injection molding.

A further object of this invention is to provide PVC articles with good surface quality and high impact resistance.

Preferably, a vinyl chloride monomer in aqueous suspension is utilized, wherein the polymerization is performed up to a conversion of 80-90% in presence of a crosslinked polybutyl acrylate. The polybutyl acrylate (PBA) can be charged together with the vinyl chloride. However, it is likewise possible to add PBA as a dispersion of VC, as well, in metered amounts. Polybutyl acrylate polymer is produced according to conventional methods in the presence of materials having a crosslinking effect.

Suitable suspension stabilizers are all types of compounds known and customarily employed for VC polymerization, as they are described, for example, in the monograph by Kainer, Polyvinylchlorid und Vinylchlorid-Mischpolymeristate [Polyvinyl Chloride and Vinyl Chloride Copolymers], Springer publishers, Berlin, Heidelberg, New York (1965), p. 16 et seq., including partially saponified polyvinyl acetate. In addition, surface-active agents such as, for example, sorbitan monolaurate, can be introduced into the polymerization mixture in order to enhance the dispersion of the monomer.

All conventional oil-soluble compounds producing free radicals can be utilized for initiation, such as, for example, acetylcyclohexylsulfonyl peroxide, alkyl perneodecanoate, dialkyl peroxodicarbonate, dilauryl peroxide, azobisisobutyronitrile, or alkyl perpivalates. The initiator should be used in initiating concentrations generally of 0.01-5% by weight, preferably 0.02-2% by weight. It is also possible to utilize mixtures.

Suitable molecular weight regulators are compounds, such as, for example, (a) the organic thio compounds: $C_2$–$C_{12}$-mercatoalkanols, mercapto-substituted-$C_2$–$C_{12}$ aliphatic carboxyl compounds, and xanthogen disulfides with $C_2$–$C_4$-alkyl radicals, including, for example, thioglycolic acid, and its esters, 2-mercaptoethanol, linear and branched mercaptans, and disulfides, including, for example, bis(isopropyl)xanthic disulfide and the like;

(b) the saturated and unsaturated chlorinated hydrocarbons of the formulae $C_nH_{(n+2-x)}Cl_x$ and $C_nH_{(2n-x)}Cl_x$, where preferably n=2-12 and more preferably n=2-4 and x=1 or more, including, for example, tetrachloromethane, trichloroethylene or dichloroethylene, methallyl chloride, and the like; and (c) $C_2$–$C_{12}$-aliphatic aldehydes, including, for example, butyraldehyde, ethylhexanal, and the like.

The addition of the regulator or a mixture of several regulators can take place all at once or, alternatively, in metered quantities. The amount depends on the efficacy of the regulator in molecular weight reduction. A quantitative measure therefor is the chain transfer constant tabulated for the system of vinyl chloride/regulator, for example, in Encycl. of Pol. Sci. Tech., 14:332. The amount added should generally range from 0.01 to 5% by weight, preferably from 0.02 to 3% by weight.

Further auxiliary agents can be, optionally, pH buffers, such as ammonium salts, alkali carbonates, auxiliary media against wall cakings, and antioxidants.

The average molecular weight of polyvinyl chloride has a reciprocal relationship to the polymerization temperature. In order to obtain low molecular weights, a temperature must thus be maintained of 50°-80° C., preferably 60°-75° C.

The examples set forth below serve for further explaining the invention. The parts indicated are parts by weight.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents, and publications, if any, cited above and below, and of corresponding West German Application No. P 39 36 066.0, filed Oct. 28, 1989, are hereby incorporated by reference.

EXAMPLES

Example 1

A 40-liter polymerization reactor of stainless steel, equipped with impeller stirrer and Pfaudler baffle, containing 14,000 parts of water together with 2300 parts of 2 25% dispersion of crosslinked polybutyl acrylate, 55 parts of a partially saponified polyvinyl acetate, 12 parts of sorbitan monolaurate, 12 parts of dilauryl peroxide, as well as 4 parts of 2-mercaptoethanol, is charged with 9500 parts of vinyl chloride.

The crosslinked polybutylacrylate had a glass transition temperature of less than −20° C. and a gel content (degree of crosslinking) equal to or greater than 85%. These polymers can be produced by reacting a mixture of 30 kg water, 10 kg butylacrylate, 180 g sodium laurate, and 40 g diallyl phthalate at 80° C. for 4 hours after the addition of 28 g of ammonium persulfate.

The reaction mixture is heated to 70° C. and polymerized to a final pressure of 5 bar. The product is dewatered, dried, and investigated analytically as well as with respect to practical application. The results of these investigations are summarized in Table 1.

The product produced according to this invention exhibits satisfactory flow characteristics (length of spiral) and very high notched impact strength. The grain size distribution of the product also fulfills the requirements to be met by injection-molded PVC.

Example 2

The procedure is followed as set out in Example 1, but using as the regulator 100 parts of trichloroethylene in place of mercaptoethanol. As in Example 1, flow characteristics and notched impact strength lie markedly above the products polymerized according to the state of the art.

Example 3

The procedure is again as in Example 1. Ethylhexanal (80 parts) is added as the regulator. The practical usage properties correspond to those in the preceding examples and exhibit the desired combination of good notched impact strength and flow characteristic.

Comparative Test 1

In a 40-liter polymerization reactor with impeller stirrer and Pfaudler baffle, 10,000 parts of vinyl chloride is dispersed with 16 parts of a hydroxyalkyl cellulose in 16,000 parts of water. After the addition of 5 parts of mercaptoethanol as the chain transfer agent, as well as of an initiator mixture made up of 12 parts of dilauryl peroxide and 7 parts of dicetylperoxidicarbonate, polymerization is conducted at 70° C. up to a final pressure of 5 bar. Processing and investigation take place as in Example 1. The product exhibits, with a narrow molecular weight distribution, an expectedly good flow behavior, but shows inadequate notched impact strength. Furthermore, the grain size distribution does not permit perfect processing of the polymer by the injection molding method.

Comparative Test 2 (According to DOS 1,943,638)

A 40-liter polymerization reactor of stainless steel, equipped with impeller stirrer and Pfaudler baffle, is charged with the following components: 20,000 parts of water containing dissolved therein 15 parts of a partially saponified polyvinyl acetate and containing dispersed therein 10 parts of dilauryl peroxide and 20 parts of dicetylperoxidicarbonate; 10,000 parts of vinyl chloride; and 150 parts of methallyl chloride. The reactor is initially heated to 43° C. and maintained at this temperature for 7 hours. Then polymerization is continued at 65° C. up to a final pressure of 5 bar. The improvement in flow is small in this product; notched impact strength is poor, as in Comparative Test 1.

Comparative Test 3 (According to EP 137,138 B1)

The procedure is performed as in Comparative Test 2, but 300 parts of methallyl chloride is added 5.5 hours (38% conversion) after reaching the first polymerization temperature of 43° C. The mixture is heated to 74° C., 15 minutes after adding the regulator and is polymerized up to a final pressure of 10 bar. The product has a very broad molecular weight distribution, excellent flow characteristic, but inadequate notched impact strength.

Comparative Test 4

Flow characteristics are characterized by "spiral length" in centimeters. The spirals are the extrudate of an injection molding machine having a rectangular cross section (width 20 mm, height 2 mm). The formulation extruded into spirals comprises 100 parts of the PVC mixed with 2.5 parts of a Ba/Cd stabilizer, and optionally a lubricant, in a high speed mixer.

The abbreviations in Table 1 have the following meanings:
ME = Mercaptoethanol
TCE = Trichloroethylene
MAC = Methallyl chloride
EH = Ethylhexanal The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

TABLE 1

|  | Exp. 1 | Exp. 2 | Exp. 3 | Standard-PVC | Comp. Exp. 1 | Comp. Exp. 2 | Comp. Exp. 3 | Comp. Exp. 4 |
|---|---|---|---|---|---|---|---|---|
| Polymerizations temp. [°C.] | 70 | 70 | 70 | 70 | 70 | 43/65 | 43/74 | — |
| Regulator [% by weight] | Me. 0.043 | TCE. 1.0 | EH 0.8 | — | ME 0.05 | MAC 1.5 | MAC 3.0 after 38% Conversion | Blend K = 52: 65 T K = 58: 27 T KM323B: 8T |
| Content of acrylate [%] | 8.0 | 7.0 | 8.3 | — | — | — | — | — |
| Sieve residue [%] |  |  |  |  |  |  |  |  |
| 63μ | 90 | 97 | 94 | 96 |  | 92 | 94 |  |
| 200μ | 2 | 1 | 0.5 | 8 | >99 | 4 | 12 |  |
| Uniformity index $U = \dfrac{M_w}{M_n} - 1$ | 1.04 | 1.68 | 1.34 | 0.82 | 2.1 |  | 6.0 |  |
| K-value | 51.7 | 51.4 | 52.4 | 58.0 | 51.4 | 55.5 | 58.5 |  |
| Spiral length [cm] | 43.5 | 43 | 42 | 32 | 42 | 38 | 54 | 37 |
| Vicat temperature [°C.] | 71 | 71 | 71 | 75 | 72 | 72 | 71 | 73 |
| Notched Impact Strength $a_K \left[ \dfrac{kJ}{m^2} \right]$ RT / 0°C. | 10.5 / 4.4 | 11 / 4.5 | 12 / 4.5 | 2.7 / 2.4 | 2.3 / 2.2 | 1.9 / 1.5 | 1.4 / 1.2 | 6.9 / 3.1 |
| Surface of the finished parts | smooth | smooth | smooth | smooth | smooth | smooth | smooth | small bubbles |

A blend is prepared from 65 parts of a PVC regulated with trichloroethylene having a K-value of 52, 27 parts of the standard PVC (see Table 1), and 8 parts of the impact resistance modifier "Paraloid" KM 323 B (Rohm & Haas).

This mixture is subjected to practical usage testing as was done with the other experimental products. The spiral length as well as the notched impact strength fail to attain the values of the products manufactured in accordance with this invention. Additionally, there is the occasional occurrence of bubbles at the flow front of the melt.

Experimental

The K values reported in Table 1 were determined by the procedure set forth in DIN 53 726. The vicat temperatures were determined by the procedures set forth in DIN 53 460 (VST/B/50). The Notched Impact Strength was determined according to Charpy.

What is claimed is:

1. A process for the production of a vinyl chloride-butyl acrylate graft copolymer suitable for processing by injection molding, in an aqueous dispersion, which comprises polymerizing vinyl chloride in the presence of a crosslinked polybutyl acrylate and regulator compounds selected from the group consisting of (a) the organic thio compounds: $C_2$-$C_{12}$-mercaptoalkanols, $C_2$-$C_{12}$-mercap-substituted aliphatic carboxyl compounds, and xanthogen disulfides with $C_2$-$C_4$-alkyl radicals, (b) the saturated or unsaturated chlorinated hydrocarbons of the formulae $C_nH_{2n+2-x}Cl_x$ and $C_nH_{(2n-x)}Cl_x$, where $n=2-12$, and (c) $C_2$-$C_{12}$-aliphatic aldehydes, in an amount effective to regulate molecular weight reduction.

2. The process of claim 1, wherein the organic thio compounds are 2-mercaptoethanol, thioglycolic acid, or bis(isoproyl)xanthic disulfide; the saturated or unsaturated chlorinated hydrocarbons are tetrachloromethane, trichloroethylene, dichloroethylene, or methallyl chloride; and the aliohatic aldehydes are butyraldehyde of ethyl-nexanal.

3. The process of claim 1, wherein the regulator compounds are utilized in amounts of 0.01-5% by weight, based on vinyl chloride monomer.

4. The process of claim 1, wherein crosslinked polybutyl acrylate is present in an amount of 1-20% by weight, based on vinyl chloride monomer.

5. A process according to claim 1, wherein polymerization is initiated by a free radical initiator.

6. A process according to claim 5, wherein the free radical initiator is acetylcyclohexylsulfonyl peroxide, alkyl perneodecanoate, dialkyl peroxodicarbonate, dilauryl peroxide, azobisisobutyronitrile, or alkyl perpiralates.

7. A process according to claim 1, wherein polymerization takes place in the presence of a suspension stabilizer and surface-active agent.

8. A vinyl chloride-butyl acrylate graft copolymer produced according to the process of claim 1.

9. A vinyl chloride-butyl acrylate graft copolymer suitable for processing by injection molding.

* * * * *